Figure 1:
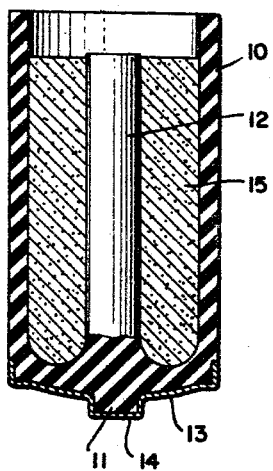

3,196,051
METHOD OF ASSEMBLING PRIMARY
BATTERIES
Rodolfo Rodriguez Balaguer, Harbor Beach, Fort Lauderdale, Fla., assignor to J. D. Hedges and Company Limited Partnership, Jamaica, British West Indies, a limited partnership of Cuba
Filed July 30, 1962, Ser. No. 213,237
1 Claim. (Cl. 136—175)

The present invention relates to primary batteries, and more particularly to the assembly of dry cell batteries of the so-called inside out type in which the carbon cathode electrode forms the battery outer shell.

In United States Patent 2,903,499, which issued September 8, 1959, to Rodolfo Rodriguez Balaguer, there is described and claimed a dry cell battery construction in which the cathode electrode is formed by a carbon cup and a carbon rod projecting from the base of the cup along the longitudinal axis of the cup. The anode electrode is formed by an annular metal sheet disposed between the rod and the cup and which is substantially concentric therewith. The space between the carbon cup, carbon rod and annular anode is filled, except for the desired air space, with the battery mix material, i.e., the depolarizing agent, electrolyte and any other chemicals which may be mixed therewith. The annular anode is separated from the battery mix by a bibulous separator, e.g., a paper or starch covering on the anode.

In making batteries of the type described, it has been the practice to fill the battery space with the battery mix and then force the annular anode through the mix into its final position. This procedure has created a problem which, while not of great significance in the case of zinc anodes, has become of substantial importance in the case of magnesium anodes. Thus, in inserting the annular anode through the battery mix, substantial force must be exerted in an axial direction, which has resulted in a greater compacting of the mix near the cup base than occurs for the mix near the open end of the cup. This greater compacting is the result of the action of the leading edge of the annular anode of the mix as the anode is pushed throgh the mix. As a result, the mix near the base of the cup has a higher density than the mix near the open end of the cup.

Actually, a density gradient will exist in the mix with the highest density adjacent the lower end of the anode and the minimum density adjacent the upper end of the anode. By "lower" end of the anode is meant that end which approaches the closed end or base of the carbon cup. By "upper" end of the anode is meant that end which is located near the open end of the carbon cup or the free edge of the mix.

This density gradient results in a tendency for the chemical attack on the anode material which occurs during battery discharge to be more severe at the lower end of the anode than at the upper end of the anode, which in turn results in an uneven consumption of the anode. Ideally, the anode material should be consumed uniformly and should be substantially completely consumed when the battery is fully discharged. But the density gradient resulting from non-uniform compacting of the battery mix during anode insertion prevents such uniform consumption. It is believed that the increase in electrical conductivity of the denser battery mix results in a concentration of current flow, i.e., a higher current density, through the denser mix which produces the uneven anode consumption.

With dry cell batteries using zinc anodes, the thickness of the anode material used and the usual mix compacting characteristics are such that the density gradient will not usually produce a significant non-uniformity in anode material consumption, although with some battery constructions the non-uniformity in zinc consumption may be significant. But with magnesium anodes and the corresponding battery mixes, the non-uniformity in anode material consumption has usually been of substantial significance. In this connection, for a standard "D" size dry cell battery, the zinc anode material commonly is 0.020" thick, while the magnesium anode material may typically be as thick as 0.60".

The principal object of the invention has been the provision of a novel and improved method of assembling primary batteries of the type described, in which substantial uniformity of battery mix density in an axial direction is achieved so that substantial uniformity in anode consumption will be achieved during battery discharge.

Another object of the invention has been the provision of such a method which is readily applicable to the high speed repetitive techniques which are required in the economical manufacture of dry cell batteries.

Figure 2:
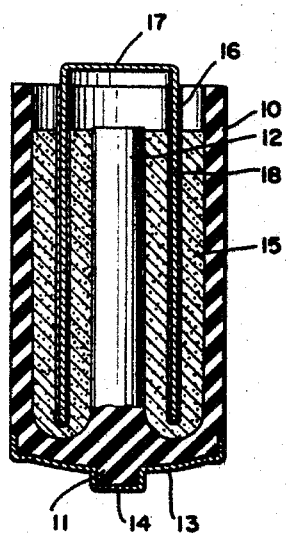

Other and further objects, features and advantages of the invention will appear more fully from the following description taken in connection with the appended drawing, in which:

FIG. 1 is a longitudinal sectional view of a battery cup of the type with which the invention is principally concerned and showing battery mix therein; and FIG. 2 is a view similar to FIG. 1 showing the anode inserted in the battery cup of FIG. 1.

In accordance with the invention, the battery mix is inserted in the battery carbon cup in a series of successive steps in each of which the cup is filled to substantially the final desired level and is then compacted to yield, after the final filling and compacting step, a density gradient substantially the inverse of that resulting from insertion of the annular anode. Thus, when the annular anode is inserted in the mix, the mix will have a substantially uniform density from top to bottom.

In FIG. 1 there is shown a battery cup of the type with which the invention is principally concerned. In FIG. 1, the cathode structure comprises a cylindrical carbon cup 10 having a closed end or base 11, the other end being open. A central carbon rod 12 projects upwardly from the cup base 11. A metal cap 13 having a contact forming boss 14 is provided over base 11. The annular space between the cup 10 and the central rod 12 is filled with battery mix 15. The space within cup 10 above the free end of central rod 12 is usually reserved as an air space into which may flow the liquid exuded upon discharge of the cell. In some types of cells this air space may be made quite small.

In FIG. 2, the battery cup is shown with a hollow cylindrical anode 16 inserted into the battery mix. Upper end 17 of anode 16 is closed and may serve as one of the battery terminals. A suitable bibulous coating 18 may be provided on anode 16 to prevent direct contact between the anode and the battery mix.

A typical "D" size dry cell of the type described may have a carbon cup height of 1 31/32", a center carbon rod height of approximately 1 3/4", a carbon cup outside diameter of 1.290", a carbon rod diameter of 0.250", and a carbon cup wall thickness of 1/16". This yields a cross-sectional area for the annular space into which battery mix is to be inserted of approximately 1.02 square inch. A typical battery mix charge for a magnesium anode cell of these dimensions will be 50 grams.

In the first step, a portion of this battery mix is dropped into the battery cup until the cup is filled to approximately the final desired mix height or slightly higher. Usually this will be approximately to the top of the center rod but in some cases may be above the top of the center rod.

The mix in the cup is then contacted with a plunger or piston which compresses the mix under a predetermined ressure. For a typical relatively moist magnesium battery mix using a magnesium bromide electrolyte, the compacting pressure might be approximately 50 pounds per square inch.

In the next step, additional battery mix is inserted in the cup again to fill the space approximately to the final desired level and the mix is again contacted with a plunger or piston to compress the mix. It has been found preferable to use the same contacting pressure in each of the mix compacting steps. The precedure is repeated until the full battery mix charge has been inserted in the cup and compacted. However, in the last step, the final increment of battery mix is filled in to slightly above the final desired level so that on the final compacting the final desired level will be achieved.

By charging the battery cup to substantially a full volume of battery mix during each filling step, the compacting of the mix will produce a density gradient which is substantially the inverse of that resulting from forcing of the anode through the mix. That is, the compacted mix will be denser at the open end of the cup than near the closed end of the cup. Hence, when the anode is inserted through the mix, the compacting action of the anode on the mix will alter the density distribution resulting from the charging steps, giving a substantially uniform distribution of battery mix density in an axial direction.

It will be appreciated that the thickness of the anode, the moisture of the mix, the compacting characteristics of the mix, the compacting pressure, and the number of mix charging-compacting steps are variables which must be mutually adjusted to yield optimum results. However, in most cases reasonably satisfactory results in the form of satisfactory mix density distribution will be achieved with three or four charging-compacting steps using a moderate compacting pressure of the order of 50 p.s.i.

While the invention has been described in connection with a specific embodiment thereof and in a specific use, various modifications thereof will occur to those skilled in the art without departing from the spirit and scope of the invention as set forth in the appended claim.

What is claimed is:

In the method of assemblying a dry cell battery having a carbon cup open at one end and forming a first cathode, a carbon rod projecting from the base of said cup and disposed generally along the longitudinal axis of said cup and forming a second cathode, an annular metallic anode disposed between said rod and said cup and being substantially concentric therewith, and a predetermined quantity of battery mix disposed between said anode and said cathodes and substantially filling the space therebetween from said base substantially to said one end of said cup, the steps comprising charging a first portion of said quantity of mix into said cup to fill the same substantially to said one end, then compressing said first quantity of mix by contacting the mix in said cup with a plunger, then charging said cup with a second portion of said quantity of mix to again fill said cup substantially to said open end, then compressing said first and second quantities of mix by contacting the mix in said cup with a plunger, repeating said last mentioned charging and compressing steps until said predetermined quantity of mix has been charged into said cup and compressed, and then forcing said annular anode through said mix in said cup and into said concentric position thereof between said rod and said cup, the pressure exerted by said plunger on said mix and the number of successive charging and compressing steps being selected so that the resulting axial density distribution in said battery mix is substantially inverse to that resulting from said annular anode insertion step whereby after said anode insertion step the density of said battery mix in said cup is substantially uniform in an axial direction.

References Cited by the Examiner
UNITED STATES PATENTS

| 1,516,632 | 11/24 | Olaneta | 136—175.15 |
| 1,897,612 | 2/33 | Helfrecht | 136—175.15 |
| 2,903,499 | 9/59 | Balaguer | 136—107 |

FOREIGN PATENTS

| 29,138 | 12/04 | Great Britain. |

WINSTON A. DOUGLAS, *Primary Examiner.*
JOHN H. MACK, *Examiner.*

UNITED STATES PATENT OFFICE
CERTIFICATE OF CORRECTION

Patent No. 3,196,051                                                          July 20, 1965

Rodolfo Rodriguez Balaguer

It is hereby certified that error appears in the above numbered patent requiring correction and that the said Letters Patent should read as corrected below.

Column 1, line 43, for "throgh" read -- through --; column 2, line 9, for "0.60" read -- 0.060 --; column 3, line 10, for "precedure" read -- procedure --.

Signed and sealed this 11th day of January 1966.

(SEAL)
Attest:

ERNEST W. SWIDER                                         EDWARD J. BRENNER
Attesting Officer                                              Commissioner of Patents